United States Patent [19]

Kutney

[11] Patent Number: 5,080,756
[45] Date of Patent: Jan. 14, 1992

[54] KRAFT PULPING PROCESS WITH SPENT SULPHURIC ACID ADDITION TO STRONG BLACK LIQUOR

[75] Inventor: Gerald W. Kutney, Ile Bizard, Canada

[73] Assignee: Marsulex Inc., Canada

[21] Appl. No.: 550,121

[22] Filed: Jul. 9, 1990

[30] Foreign Application Priority Data

Jul. 10, 1989 [CA] Canada .................................. 605195

[51] Int. Cl.$^5$ .......................................... D21C 11/1C
[52] U.S. Cl. .................................. 162/30.11; 162/301
[58] Field of Search ...................... 162/30.1, 30.11, 31; 423/DIG. 3

[56] References Cited

U.S. PATENT DOCUMENTS 4,498,955 2/1985 Nelson .............................. 162/30.11

OTHER PUBLICATIONS

A. W. Pesch, "Substitutes for Salt Cake and Sulphur in the Kraft Pulping Process", TAPPI, 39 (6), p. 353 (1956).

J. N. Swartz, R. C. MacDonald & P. C. Hambaugh, "Kraft Liquor Sulphidity Control with Sulphuric Acid", TAPPI, 43(5) p. 499 (1960).

Primary Examiner—Karen M. Hastings
Attorney, Agent, or Firm—Cushman, Darby & Cushman

[57] ABSTRACT

An improved kraft pulping process is characterized by the addition of a spent concentrated sulphuric acid composition containing organic matter to a kraft recovery system to provide a mixture enriched in its total sulphur content that is subjected to dehydration, pyrolysis and reduction in a recovery furnace. The organic matter of the sulphuric acid composition is particularly beneficial as a source of thermal energy that enables high heat levels to be easily maintained to facilitate the oxidation and reduction reactions that take place in the furnace, thus resulting in the formation of sulphide used for the preparation of cooking liquor suitable for pulping.

2 Claims, 1 Drawing Sheet

KRAFT PULPING PROCESS WITH SPENT SULPHURIC ACID ADDITION TO STRONG BLACK LIQUOR

The present invention relates to an improved kraft pulping process wherein sulphur losses are conveniently replenished in the recovery system with an accompanying improvement in the efficiency of the system.

The kraft pulping of lignocellulosic material in the form of wood chips usually entails the chemical fragmentation and dissolution of mainly the lignin component of the wood by an alkaline cooking liquor (white liquor) containing sodium hydroxide and sodium sulphide or hydrosulphide The lignin serves as a "cement" that binds the cellulose fibers and the dissolution of this lignin causes these fibers to be liberated. The fibers are then separated from the residual cooking liquor, which is referred to as black liquor, and the black liquor is sent to the kraft recovery system.

The kraft process presently dominates the pulp and paper industry not only because of the superior pulp qualities that it provides, but also because it includes a chemical recovery system whose main objectives are: 1) to recover the chemicals used in the cooking of the wood and reconstitution of the chemicals to form fresh white liquor, and 2) to recover and beneficially use the thermal energy from the black liquor through concentration and combustion in a recovery furnace.

The liquor that is washed and extracted from the pulp following the pulping stage is referred to as "weak" black liquor and generally contains 14% to 17% dissolved solids composed of about one-third spent inorganic chemicals which were in the white liquor used for pulping and two-thirds organic chemicals resulting from the dissolution of wood components. The sulphur content is partially tied up in organic compounds and partially in inorganic compounds (associated with sodium). In the recovery system, firstly the weak black liquor is concentrated by evaporation of water with the use of multiple effect evaporators and concentrators, raising the solids concentratin to over 60%, and preferably to about 65%, in order to allow it to burn effectively in the recovery furnace without the use of supplemental fuel. The recovery furnace converts the combustible constituents of the black liquor that were extracted during pulping into usable steam energy, and produces a variety of reduced sulphur species, notably sulphide. Also, sodium organic compounds are converted to sodium carbonate. The recovered chemicals are then discharged from the furnace bottom as a molten smelt (comprising largely the sodium sulphide and sodium carbonate together with some sodium sulphate).

Conversion of the smelt to ultimately provide the white liquor for cooking is accomplished in the recausticizing plant. Molten smelt from the bottom of the recovery furnace is dissolved in water to become green liquor, so called due to the greenish colour from metal ion impurities. Insoluble elements called dregs are removed by settling, and the clarified green liquor solution from the smelt dissolving tank at this stage contains mainly sodium carbonate and sodium sulphide, with some sodium hydroxide and minor amounts of sodium sulphate and miscellaneous components extracted from the wood or introduced with the wash water.

The green liquor is reacted with lime (calcium oxide) in the slaker. The reaction involves the conversion of sodium carbonate in the green liquor to sodium hydroxide, a process referred to as causticizing, with the formation of by-product lime mud or calcium carbonate. The lime mud is separated from the liquor by settling or filtering and the clarified solution is the white liquor used for cooking. The lime mud separated from the white liquor is washed and thickened to about 70% solids before entering the calciner, which converts the lime mud back to lime.

The causticizing reaction is carried out until about 85% complete, thereby leaving about 15% sodium carbonate as $Na_2O$ from the original feed to be subsequently contained in the white liquor.. The sodium sulphide remains essentially unchanged during causticizing, so its amount is established in the smelt dissolving tank unless make up sodium sulphide is added.

The white liquor solution is clarified to less than 100 ppm of undissolved solids to eliminate the possibility of inert impurities contaminating the pulp resulting from the cooking process. The sodium hydroxide and sodium sulphide are the active ingredients in the white liquor with a targetted combined normal concentration of approximately 100 g/L (6.2 lb/cu ft) expressed as $Na_2O$.

The recovery furnace is at the heart of the kraft recovery system and has the following essential functions:
1. Evaporates residual moisture from the liquor solids.
2. Pyrolyzes the organic constituents.
3. Supplies heat for steam generation.
4. Reduces oxidized sulphur compounds to sulphides.
5. Recovers inorganic chemicals in molten form.

The concentrated black liquor is sprayed into a central drying zone of the furnace wherein the liquor droplets are dehydrated prior to pyrolysis. The dehydration requires heat input and therefore reduces the temperature in the furnace fireball. Dehydration also requires time before pyrolysis can take place. Therefore, a more highly concentrated black liquor spray and the presence of highly combustible constituents are advantageous at this stage. The pyrolysis produces volatile combustibles through thermal degradation of the organic compounds and the residual material from the pyrolysis is the starting material for char bed processes. Also, pyrolysis is primarily responsible for the release of sulphur gases within the furnace cavity. Sulphate and sulphite are resistant to sulphur release during pyrolysis, but the sulphur in sulphide and thiosulphate is not stable and a substantial fraction of this sulphur can be converted to reduced sulphur gases, such as hydrogen sulphide. The volatilization of sulphur-containing materials during pyrolysis has a major effect on potential furnace emissions. The only acceptable way for sulphur to leave the furnace is when it is tied up as sodium sulphide in the smelt. During pyrolysis some sulphur is separated from sodium. If it does not recombine with sodium somewhere in the furnace, it will leave as either reduced sulphur gases or $SO_2$. Elemental sulphur also tends to form reduced sulphur gases, and thereby contributes to potential increases in emissions from the furnace.

The final combustion of the volatile combustibles occurs in the oxidizing upper zone of the furnace, wherein a sufficient supply of air, an adequate degree of mixing and a contact time at temperature sufficient to allow the reactions to proceed to completion are required.

The residual material from the pyrolysis of black liquor solids falls to the bottom of the furnace as pellets containing inorganic salts (mainly sodium carbonate and sodium sulphate) forming a char bed which is melted and burned. The carbon of the char bed reacts with molten sulphate to give carbon monoxide and carbon dioxide; the sulphate being reduced to sulphide. The molten sodium carbonate and sodium sulphide runs out of the bottom of the furnace as the smelt. A reducing environment must be maintained in the bottom zone of the furnace for sulphide to be present. These highly temperature-sensitive reactions of sulphate to sulphide are endothermic and act as heat sink to the char bed. The bed regions in which significant temperature gradients exist are thus the regions where reduction is taking place at significant rates. The combination of an endothermic reaction and strongly temperature-sensitive kinetics causes the reaction to be self-limiting, unless heat is added from an external source. Inside the char bed, the reaction ceases when temperatures approach 1470° F. (800° C.). The bed surface temperature sets the initial rate of reaction, determines the amount of sensible heat available for the endothermic reactions to draw on, and influences the apparent thermal conductivity of the bed. High bed surface temperatures are favorable to reduction on all three counts.

Substantial quantities of hydrogen sulphide are released by pyrolysis of the solids contained in black liquor. Much of the pyrolysis occurs in and around the char bed where sodium carbonate is available. Providing that the temperature is sufficiently high, as indicated by a free-flowing smelt, $H_2S$ absorption can occur by reaction with $Na_2CO_3$ to give $Na_2S$ and carbon dioxide.

Another product of black liquor combustion is fume (very small particles of $Na_2SO_4$ and $Na_2CO_3$). The fume is believed to originate from sodium vapour produced in the high temperature reducing environment of the char bed by the endothermic reduction of $Na_2CO_3$. This serves as another substantial heat sink. The sodium vapour is readily oxidized to sodium oxide that reacts with $CO_2$ in the lower region of the furnace to form $Na_2CO_3$ fume. The $Na_2CO_3$ fume or unreacted $Na_2O$, as it proceeds into the upper zones of the furnace, can trap sulphur gases such as $SO_2$ and $SO_3$ as $Na_2SO_4$ fume and thus reduce the potential for emission of these gaseous sulphur compounds. The sulphate-forming reactions take precedence as long as there is an adequate supply of sulphur present. Sodium volatilization, and hence fume formation, is favoured by increased bed temperatures and intensity of the reducing atomsphere.

It is well established that wood chips digested in white cooking liquor will produce pulp with increasing strength and yield and at decreasing cooking time as the relative amount of sodium sulphide in the liquor is increased. The sulphur level or sulphur value of white liquor is normally expressed as sulphidity [sulphidity, % $= 100 \times Na_2S/(NaOH+Na_2S)$ all expressed as grams per liter of $Na_2O$]. Typical sulphidities of kraft cooking liquors are in the range 20% to 30% and the effect of increasing NaOH would decrease the sulphidity.

The higher levels of sulphidity required for pulping to achieve a high quality product also give rise to higher sulphur emissions due to limitations associated with the operation of the recovery system. This will have an unfavourable effect on the overall economics. The desired higher levels of sulphidity must be balanced with the efficient operation of a recovery system that must conform with stringent emission standards. Therefore, a source of make up sulphur that contributes to sulphidity and increases the efficiency of the recovery system is an advantage.

Further, there is a problem associated with maintaining and controlling kraft white liquor sulphidity. The major chemical components of the white liquor are sodium hydroxide and sodium sulphide and chemical losses occur at many points in the pulping and recovery processes. Most of the total sodium and roughly two-thirds of the total sulphur in the white liquor are recovered from the black liquor. The remainder of the sodium and sulphur is derived from the make up chemicals which must be added in order to replace the total sodium and sulphur losses from the entire liquor system. It is necessary to maintain a balance of the chemical values of sodium and sulphur. Each mill will have its own problems peculiar to the equipment on hand and method of operation, and the sodium and sulphur are lost at different rates. Average sulphur recovery efficiency is around 60% to 70% and the average sodium recovery efficiency is around 90 to 95%.

Salt cake, namely crude anhydrous sodium sulphate, is the traditional and most commonly used make-up chemical of the kraft process. Salt cake is a reasonably economical and so-called convenient chemical source of both sodium and sulphur that is added to the black liquor at the recovery furnace. Frequently, in order to maintain the required sulphidity, elemental sulphur is used to supplement the sulphur content of the salt cake due to an imbalance in the sodium/sulphur ratio that may occur.

The limited control of individual chemical make up associated with the dual role of salt cake providing both sodium and sulphur values to the recovery system is, however, a drawback. Also, the salt cake is normally added to the system as a solid, to the concentrated black liquor in a mix tank, and the handling of solids would preferably be avoided due to the inferior equipment available and the extra manpower required. Furthermore, incomplete mixing and dissolution of the salt cake in the black liquor, contributing to a more heterogeneous system, causes clumping to occur and can lead to the development of a non-uniform dehydration and pyrolysis/combustion profile in the furnace.

The sodium and sulphur required as make up can, however, be obtained from other sources besides salt cake. Some less common alternatives have been proposed by Pesch (TAPPI, 39(6), 353 (1956)). These include Glauber's Salt ($Na_2SO_4$ $10H_2O$), sodium sulphite, sodium hydrogen sulphate or a mixture made up of sodium carbonate and elemental sulphur and calcium sulphate. Elemental sulphur, referred to above for use as a supplemental source of sulphur value during salt cake addition, has been used to completely replace salt cake with concurrent addition of sodium hydroxide as the source of sodium. The attractive feature of elemental sulphur is its availability as an emulsion, commonly referred to simply as emulsified sulphur, hereinbelow E. S., which is pumpable. This simplifies its mode of addition, as well as slightly facilitates mixing as compared with salt cake. Usually, E. S. is added to the black liquor in the recovery system and includes about 30% water that must be evaporated, if not prior to entering the furnace, then within the furnace, which is in fact the more common procedure. The extra water adds a significant amount of time to the dehydration process in the furnace, and since pyrolysis and gasification cannot begin until dehydration is complete, the amount of carbon that is gasified before the liquor reaches the char bed is restricted. Also, the added dehydration consumes heat causing a decrease in the temperature of the fireball and thus increasing the difficulty in burning the liquor, the result of which is incomplete combustion.

A further disadvantage of E. S. is that conversion efficiencies of sulphur to sulphide in the furnace are notably low, the manifestation of which is higher gaseous emissions. Also, a reduction in the life of the furnace wall is suspected from continued E. S. use stemming from the intermediate formation of corrosive sulphur trioxide.

Sodium hydrosulphide and sodium sulphide would be ideal candidates as salt cake replacements since they are commonly used in preparing "synthetic" white liquor for the initial charge in a new mill or for mill start-ups after shut-downs or in emergency situations. Unfortunately, their relative price is prohibitively high to be practical in continued use.

Chlorine dioxide generator by-product may include salt cake, which is used in the kraft recovery process. Some chlorine dioxide generators have a sulphuric acid by-product that is sent to the recovery process. This by-product sulphuric acid is normally less than 70% strength and is added to the weak black liquor ahead of the evaporators. Since this more dilute acid addition significantly increases the load on the evaporators, its use is somewhat restricted. Although the sulphuric acid does contribute sulphur value to the process, it is contaminated with chlorine residuals arising from the chlorine dioxide generator that would be retained in the recovery cycle and build up to relatively high concentrations. The patterns of performance of the various zones in the furnace become altered as the ratio of inorganics/organics increases, and mills with high chloride levels have tended to operate with relatively low bed temperatures and high $SO_2$ emissions.

Other extraneous elements entering the system can form compounds that play havoc around the recovery loop resulting in, for example, a glassy and viscous smelt.

The use of a concentrated sulphuric acid to balance the excess sodium of a spent cold caustic pulping liquor from a caustic hardwood pulping operation, and thus permit the recovery of this liquor in a kraft recovery system, has been described by Swartz, J. N., MacDonald, R. C. and Hambaugh, P. C., in Tappi, 43(5), 499 (1960).

Economics play an important role in determining whether a particular material or combination of materials may seriously be considered as make up for sulphur value in a kraft pulping process and, in fact, there still exists in the pulp and paper industry a long felt want for a more convenient and economically practicable solution to this problem.

It has now been discovered that a readily available concentrated sulphuric acid composition containing useful organic matter can conveniently, economically and efficiently be used to provide sulphur value back to a kraft pulping process.

Sulphuric acid and oleums are widely used in many industrial processes. Commercial grades of sulphuric acid include 93% and 98% strength material whereas higher strength material is available commercially as 104.50%, 105.62%, 106.75%, and 114.63% corresponding to 20%, 25%, 30% and 65% oleum, respectively. Several industrial processes use a full strength (or approximate) sulphuric acid or oleum added directly to the reaction medium. Examples of these processes include: the dehydration of wet materials such as in the drying of chlorine gas produced in chloralkali plants; the manufacture of detergents derived from the sulphonation of organics to produce alkylbenzene sulphonates; refining of lubricating oils; and the production of branched chain paraffins by the catalytic action of sulphuric acid on isoparaffin and light olefins, a process typically referred to as "alkylation".

In most processes utilizing sulphuric acid a portion of the original sulphuric acid, charged to the system, remains at the end of the reaction. At this stage, the sulphuric acid is commonly referred to as being "spent" since, for the particular process from which it originates, it has become exhausted of sufficient acid to the point that it is no longer suitable for use without upgrading or fortification. Some processes that utilize high strength sulphuric acid or oleum typically produce a spent acid that remains relatively high in residual acid but also contains contaminants arising from the specific process.

The contaminants in the spent sulphuric acids of this type are generally a myriad of inorganic, and polar and non-polar organic matter, the specific nature of which is standard, within certain ranges, for the process from which it is derived. For example, a spent sulphuric acid generated from a sulphonation process will contain residual sulphuric acid content in the range 75%-98% (w/w) $H_2SO_4$ and total organic carbon (TOC) in the range 0.1%-7.0% (w/w). The spent acid generated by an alkylation process will contain residual sulphuric acid in the range 86%-92% (w/w) $H_2SO_4$ and total carbon content in the range 2.0%-6.0%. However, the impurities in alkylation spent sulphuric acid are so highly coloured that reuse in another process is extremely limited. Furthermore, the volumes of this spent acid generated in industry are currently far larger than the volumes required by the few processes known to be compatible. Due to these inherent difficulties, alkylation spent sulphuric acid has historically been treated and regenerated by decomposition in a combustion chamber to chemically reduce the acid essentially to sulphur dioxide and water followed by catalytic oxidation of the sulphur dioxide to sulphur trioxide, and subsequent absorption of the sulphur trioxide in weak acid to produce fresh sulphuric acid. Although many types of spent sulphuric acids could be treated in this manner, the process is typically restricted to spent acids high in sulphuric acid and organics content. A low acid concentration suggests a concomitant high water content. This high water content, if present in the spent acid, will lead to higher regeneration costs as the water must be removed as vapour. This regeneration process is not without drawbacks, notably costs associated with treatment and difficulties in maintaining a high quality fresh acid. For these reasons there also continues to be interest in discovering new uses and treatment processes for concentrated spent sulphuric acids containing significant levels of organic matter.

It has now been found that when a spent concentrated sulphuric acid containing substantial levels of organic matter is neutralized with the residual alkalinity present in spent pulping liquor from a kraft pulping process, the mixture thus formed can provide the sulphur requirement to the pulp mill. Also, interestingly, the organic content of the spent sulphuric acid blends and is compatible with the complex mixture of organics originating from the pulping process, thereby providing an increase in both the heat content of the black liquor and, from pyrolysis in the recovery furnace, the subsequent level of carbon in the char bed. This allows for inter alia the more efficient reduction of the sulphur compounds to sulphides, the desired chemical species active in pulping.

It is an object of the present invention to provide an improved kraft pulping process characterized by the addition of a spent concentrated sulphuric acid composition containing organic matter in order to replenish sulphur losses, and provide thermal energy that enables high heat levels to be easily maintained for efficient operation of the recovery system.

Accordingly, the present invention provides an improved kraft pulping process comprising the steps of
(a) cooking a lignocellulosic material in a pulping digester with a cooking liquor containing sodium hydroxide and sodium sulphide or hydrosulphide to provide a kraft brownstock pulp and a weak black liquor;
(b) treating said weak black liquor in a kraft recovery system comprising the stages of
  (i) concentrating said weak black liquor to provide a strong black liquor;
  (ii) pyrolyzing said strong black liquor to effect oxidation of sulphur value in said black liquor, and to form pellets comprising sodium carbonate and sodium sulphate, and to effect reduction of said sodium sulphate in said pellets under reducing conditions to further provide a smelt comprising sodium sulphide and sodium carbonate;
the improvement comprising the addition of a spent concentrated sulphuric acid composition containing a substantial amount of organic matter to said pulping process in an amount sufficient to enhance said oxidation and reduction, and said sulphuric acid composition to further provide sulphur value in whole or in part to said pulping process.

Preferably, the concentrated sulphuric acid composition contains from about 1% to about 12% organic matter, and more preferably from about 2% to about 6% organic matter.

Also, preferably the concentrated sulphuric acid composition is of a strength greater than about 75% sulphuric acid and more preferably greater than about 86% sulphuric acid.

Suitable concentrated sulphuric acid compositions are available as so-called spent sulphuric acid from a variety of industrial processes. For example, a spent sulphuric acid generated from a sulphonation process contains sulphuric acid in the range from about 75% to about 98% (w/w) and up to about 7% (w/w) organic matter (as total organic carbon). The spent acid generated by an alkylation process contains sulphuric acid in the range from 86% to about 92% (w/w) and organic matter (as total carbon) in the range from about 2% to about 6% (w/w). The highly coloured nature of these compositions severely limits their application elsewhere, but is of no consequence in the process of the present invention. Many of these spent acid compositions are also malodorous, which is very problematic in other applications. However, again, this is of no consequence in the process of the present invention.

In a feature of the process according to the present invention the spent concentrated sulphuric acid composition, hereinabove defined, is added to a black liquor in said pulping process to give a sulphur enriched mixture that is subsequently subjected to pyrolysis and reduction in said recovery system. Preferably, said acid composition is added to a strong black liquor. Also, preferably, said mixture is subjected to pyrolysis and reduction in a kraft recovery furnace. In this fashion, the smelt exiting the furnace is enriched in sulphide and thus continues through the recovery system to provide a fortified white liquor, enriched in sulphur content, suitable for pulping.

According to the process of the present invention, the sulphuric acid composition may be added ahead of the pulping digesters. In this instance the high alkalinity of pulping liquors in the kraft process serves to neutralize the sulphuric acid composition, to varying degrees, forming the sulphate salt, most commonly sodium sulphate. However, the sodium sulphate produced would diminish the amount of effective alkali available for pulping. Also, losses of the sodium sulphate would occur in subsequent pulp washing stages, thereby reducing the amount of sulphur available for recovery.

Preferably, the concentrated sulphuric acid composition for use in the method of the present invention is added to a black liquor where there is sufficient alkalinity and mixing to prevent undesirable effects resulting from too high a level of acidity. Typically, enough effective alkali is present in the digester that 25% of it is remaining at the end of a cook. Operating problems may arise if the acid composition is not added in the proper proportion to the liquor to maintain sufficient alkalinity. Sufficient black liquor alkalinity must be present to maintain satisfactory liquor viscosity for atomization in the black liquor guns feeding the recovery furnace; to prevent hydrogen sulphide gas liberation and; to prevent the excess precipitation of lignin.

Conventional wisdom would dictate that spent sulphuric acid compositions cannot be added to strong black liquor immediately ahead of the recovery furnace owing to the resultant decrease in solids content to below critical levels for satisfactory operation of the furnace. However, in a preferred embodiment of the present invention, the acid composition is added to a strong black liquor in a kraft pulping process to give a mixture enriched in total sulphur content that is subsequently subjected to pyrolysis and reduction in a kraft recovery furnace.

The versatility in the improved process of the present invention is apparent by the modes of addition of the acid composition to a recovery system. Said composition can be added to strong black liquor, weak black liquor, or can be blended with suitable by-product acid from other processes (e.g. tall oil and chlorine dioxide plants) prior to addition.

The spent sulphuric acid for use in the present invention is preferably added to strong black liquor at a location where sufficient alkalinity and mixing can take place to achieve acid neutralization and lessen inhomogeneities in solution. Examples of suitable addition sites include any vessel where strong black liquor is stored and/or agitated (e.g. retention tanks and salt cake mix tanks) or even any process line through which the strong black liquor is carried, provided it is constructed of suitable material and far enough upstream of the recovery furnace to ensure neutralization prior to firing of the liquor. Any type of mixer is also included in this latter category.

The organic matter in the acid composition acts as a source of fuel and contributes to combustion in the furnace. Also, the neutralization of a concentrated sulphuric acid by the alkali of the black liquor provides significant heat input to the black liquor. These add to the usable steam energy that is normally being generated. The additional combustion assists in the dehydration of the liquor droplets, that are sprayed into the drying zone of the furnace. Also, the additional heat aids in pyrolysis of lignin-derived organic matter. In the reducing zone of the furnace, where the crucial temperature-sensitive reaction of sulphate to sulphide takes place, the additional heat value of the organic matter of the acid composition is an advantage by contributing to high char bed surface temperatures. High temperatures also provide a free-flowing smelt. Substantial quantities of hydrogen sulphide are normally released by black liquor pyrolysis and the higher temperatures facilitate also hydrogen sulphide absorption by reaction with sodium carbonate (or sodium carbonate fume whose production is also enhanced with higher heat) to give sodium sulphide and carbon dioxide. In this fashion, the TRS emissions from a recovery furnace may be reduced. Sodium carbonate fume also traps sulphur dioxide and sulphur trioxide gases as sodium sulphate fume.

It will be understood by persons skilled in the art of the kraft process that pulping in the process of the present invention refers to any kraft pulping stage in common usage comprising a batch pulping digester or a continuous pulping digester wherein lignocellulosic material is cooked under pressure in alkaline conditions and in the presence of sulphur-containing compounds, especially sulphides. The pulping produces a kraft brownstock pulp, from which weak black liquor is extracted.

As a typical kraft pulping process requires sodium values to be replenished in addition to sulphur values, the former can be made up by addition of a suitable sodium-containing compound—sodium hydroxide is especially convenient. To be compatible with the present invention as disclosed, it is suitable to add sodium hydroxide, for example, at a separate location than, or concurrently with, the sulphuric acid composition. This could include sodium hydroxide addition to the white liquor thereby increasing the active alkali content for the cooking stage; subsequent carryover of the residual alkali to the black liquor would satisfactorily neutralize the sulphuric acid composition. It would be recognized by one skilled in the art that the amount of sodium hydroxide added is limited by the negative effect that it may have in the overall process, i.e. the pulp strength properties may deteriorate. Separate sources of sodium and sulphur value for make up provides the advantage of better control over the sulphur/sodium ratio. This allows for better control over sulphidity and effective alkali for pulping. The opportunity provided by the present invention for conveniently increasing the sulphidity provides the opportunity for decreased pulping times per cook with the associated steam savings and production rate increase.

To summarize the benefits of the present invention:
1. The organic matter contained in the spent concentrated sulphuric acid serves as a source of added fuel in order to maintain or achieve high heat levels in various zones of the recovery furnace resulting in an improvement in the operation of the furnace as a whole and for the specific reasons described hereinbefore.
2. The heat of neutralization upon addition of the spent acid to the black liquor lessens the requirement for providing external heat.
3. The flexibility in providing separate sources of sulphur and sodium make up and thus also permitting alternative sites for their individual addition allows for better control of the desired sulphur/sodium ratios throughout the system.
4. The use of spent acid can lower TRS emissions.
5. It provides a convenient method of increasing the sulphidity of white liquor resulting in decreased pulping time, and thus providing for production capacity increases, and steam savings per cook.
6. The economics are favourable in that an inexpensive source of spent acid is available and costly upgrading is not necessary.
7. The process of the present invention is conveniently implemented using standard types of equipment that are readily available.

Preferred embodiments of the present invention will now be illustrated by way of examples.

EXAMPLE 1

Figure 1:
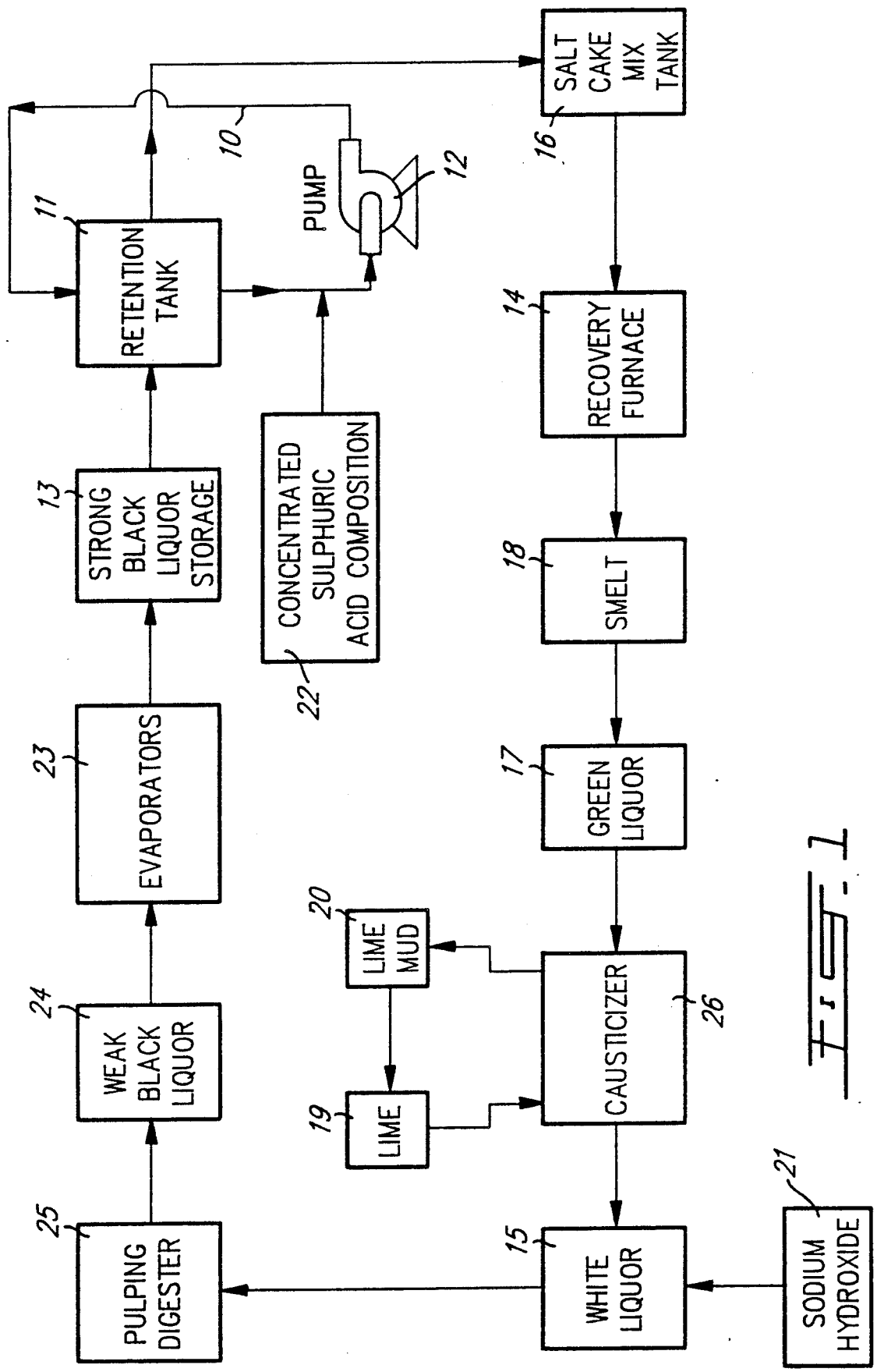
FIG. 1 is a schematic diagram showing the addition of a spent concentrated sulphuric acid composition to the recovery system of a kraft pulping process according to a preferred embodiment of the process of the present invention.

The acid composition used was the spent acid from an alkylation process. Said composition contained 89.4% sulphuric acid (w/w) and 4.3% organic matter (w/w as total carbon).

With reference to FIG. 1, the spent concentrated sulphuric acid (22) was added directly in-line to a liquor circulation loop (10) of a retention tank (11), to which strong black liquor was fed. The liquor circulation loop (10) included a pump (12), which provided a sufficient flow rate for adequate in-line mixing of the spent acid with the liquor. The retention tank (11) was equipped with means to provide further mixing. The retention tank (11) was situated between the strong black liquor storage (13) and the recovery furnace (14). The strong black liquor was produced by the action of multi-effect evaporators (23) on weak black liquor (24), which was extracted from the brownstock produced by the pulping digester (25).

In this instance, sodium hydroxide (21) was added to the white liquor storage (15) in order to provide the make up sodium value.

The resulting sulphur-enriched black liquor mixture exiting the retention tank (11) passed through a mix tank (16) that had previously been used for salt cake addition. No salt cake was added in this instance, however, and this mix tank served no function in the present case. From this mix tank, the liquor mixture enters the recovery furnace (14).

Measurement of hydrogen sulphide levels in and around the retention tank using Gastec (trade mark) analyzer tubes specific for this gas, indicated levels less than 0.5 ppm. Therefore, there is no significant release of hydrogen sulphide gas upon addition of the acid composition, and thus no adverse effect.

The pH of the strong black liquor was monitored during the addition and remained above the acceptable lower limit of 10.3 (based on desired liquor properties).

Firing of the liquor into the furnace proceeded smoothly and burning occurred with a bright flame.

The sulphidity level of the green liquor (17) prepared from the smelt (18) that exits the furnace remained at a very high level throughout the experiment. The average green liquor sulphidity value was 26.4%. The green liquor (17) was converted to white liquor in the causticizer (26), during which step lime (19) is converted to lime mud (20).

The white liquor sulphidity was maintained at an average value of 25.4%, which is a full percentage point above the average value based on a control using salt cake only.

Further results, that are of a qualitative nature, include: a purer white lime, rather than being yellow coloured as observed during E. S. use, indicating the absence of elemental sulphur contamination; problem free operation of precipitators and rectifiers; no precipitation of lignin nor plugging of spray nozzles; and free-flowing smelt.

EXAMPLE 2

Operating conditions are as defined in Example 1.
Results

The average value for TRS emissions for the experimental period is 6.65 ppb as compared to 7.78 ppb under normal operation with sodium sulphate and emulsified sulphur as sulphur make up.

A comparison of white liquor sulphidity data for various operating periods using different sources of sulphur make up is shown in Table 1.

TABLE 1

| Time Period (no. of days) | Sulphur Source | Amount [Average Tons Per Day (TPD)] | Average % Sulphidity |
|---|---|---|---|
| 8 | Emulsified Sulphur (E.S.) | 3.93 | 23.79 |
| 13 | Spent Sulphuric Acid | 7.39 | 24.03 |
| 8 | E.S. + Spent Sulphuric Acid | 3.80 + 1.00 | 24.79 |

The embodiments of the invention in which an exclusive property or privilege is claimed are defined as follows:

1. In an improved kraft pulping process comprising the steps of
    (a) cooking a lignocellulosic material in a pulping digester with a cooking liquor containing sodium hydroxide and sodium sulphide or hydrosulphide to provide a kraft brownstock pulp and a weak black liquor;
    (b) treating said weak black liquor in a kraft recovery system comprising the stages of
        (i) concentrating said weak black liquor to provide a strong black liquor;
        (ii) pyrolyzing said strong black liquor to effect oxidation of sulphur value in said black liquor, and to form pellets comprising sodium carbonate and sodium sulphate, and to effect reduction of said sodium sulphate in said pellets under reducing conditions to further provide a smelt comprising sodium sulphide and sodium carbonate;
    the improvement comprising adding a spent concentrated sulphuric acid composition of a strength greater than about 75% sulphuric acid and containing a substantial amount of organic matter to said strong black liquor in an amount sufficient to enhance said oxidation and reduction, and said sulphuric acid composition to further provide sulphur value in whole or in part to said pulping process, wherein said spent concentrated sulfuric acid composition contains from about 1% to about 12% of organic matter.

2. A process as claimed in claim 1, wherein said spent concentrated sulphuric acid composition is of a strength greater than about 86% sulphuric acid.

* * * * *